Figure 5:
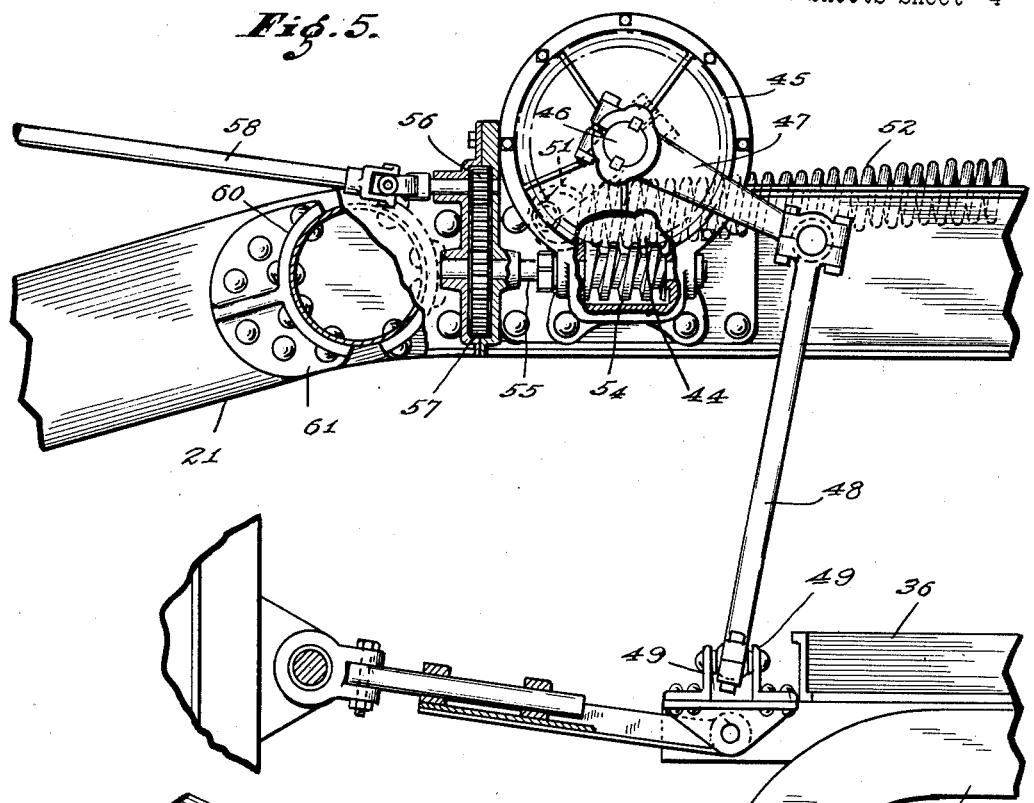

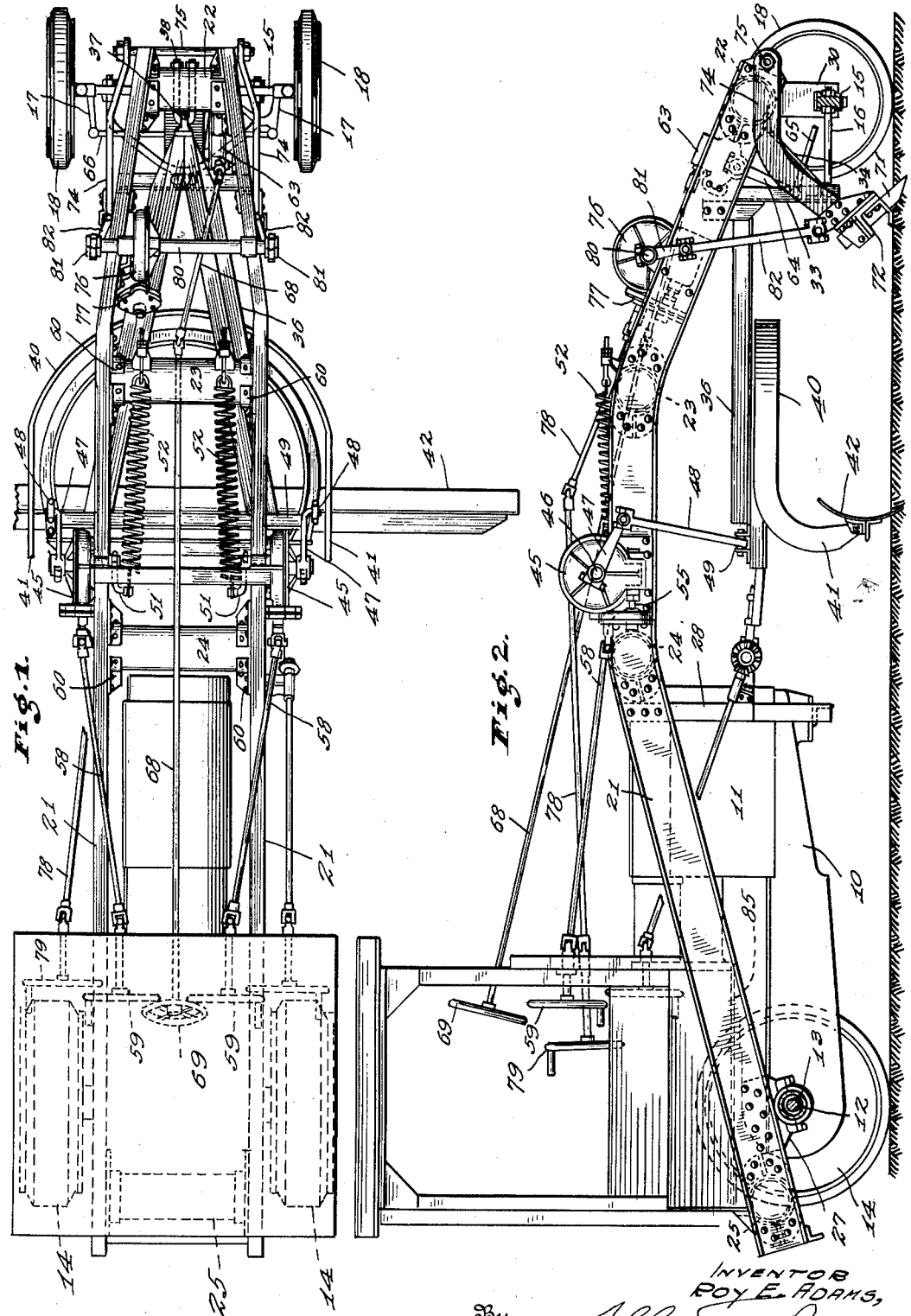

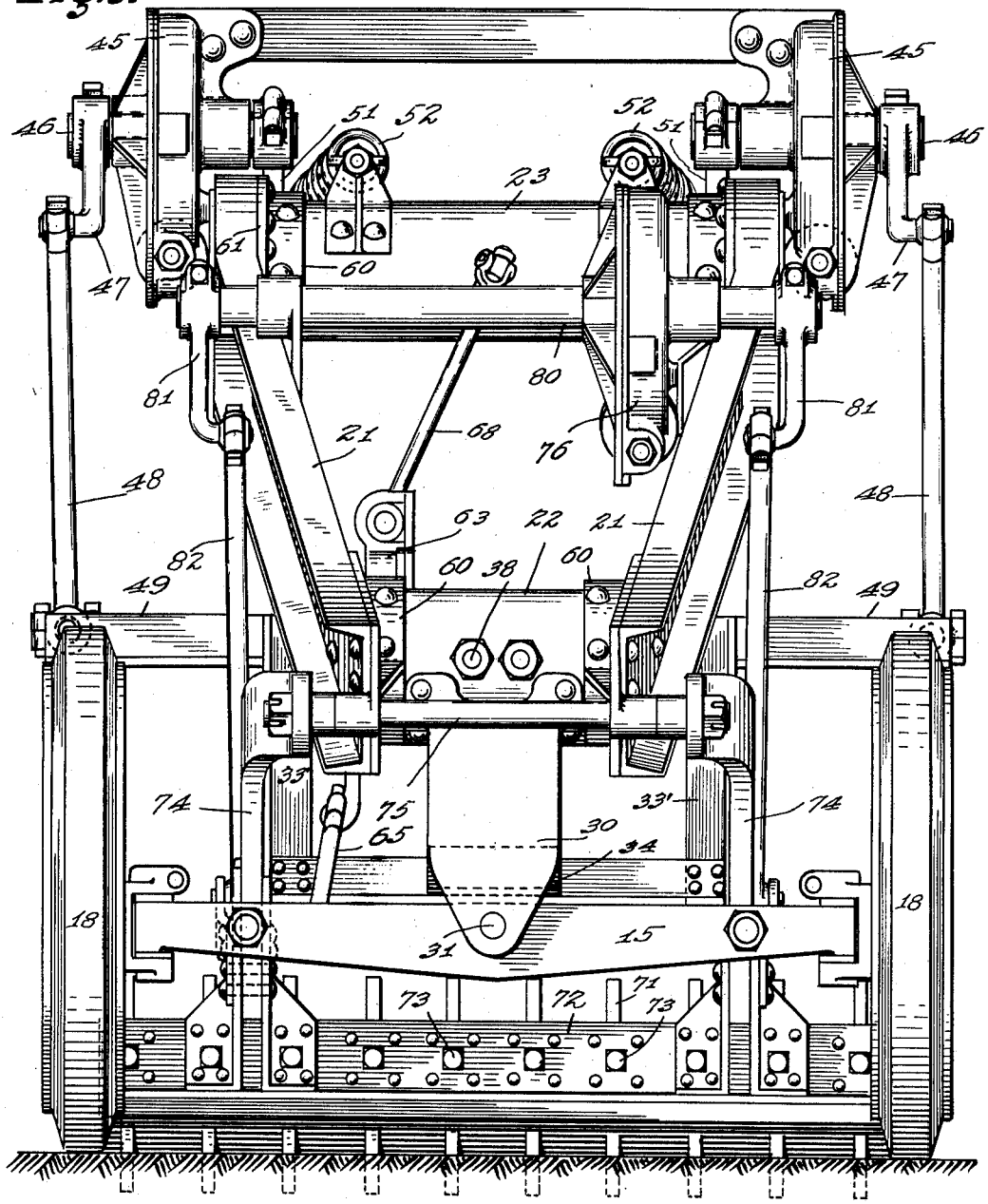

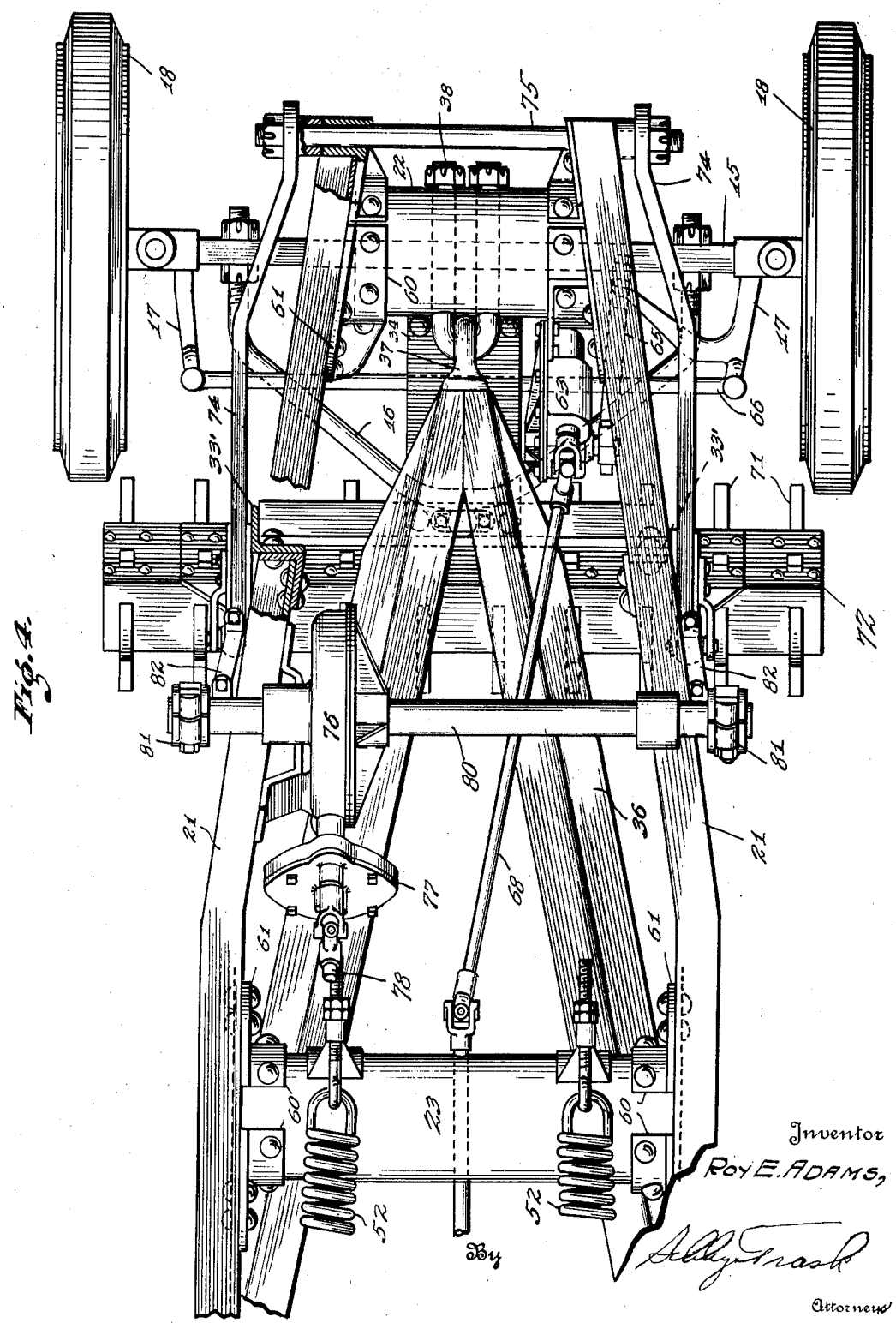

June 5, 1934.　　　　　R. E. ADAMS　　　　1,962,099

ROAD GRADER

Original Filed Feb. 8, 1929　　4 Sheets-Sheet 4

Inventor
Roy E. Adams,

Attorneys

Patented June 5, 1934

1,962,099

UNITED STATES PATENT OFFICE 1,962,099

ROAD GRADER

Roy E. Adams, Indianapolis, Ind., assignor to J. D. Adams Manufacturing Company, Indianapolis, Ind., a corporation of Indiana Application February 8, 1929, Serial No. 338,385
Renewed March 1, 1933

15 Claims. (Cl. 37—145)

My invention is concerned with road graders, and more particularly with self-propelled or motor graders. Such machines usually are built around a commercial form of tractor, the engine of which supplies the motor power for the grader.

The construction of a satisfactory road grader embodying parts of a commercial tractor presents a variety of problems, particularly if the grader is designed to do work other than the very lightest of scraping and maintenance work. For instance, if a self-propelled grader is to embody the frame and rear axle of the tractor, the width of the grader frame and the tread of the rear wheels are limited by the design of the tractor; whereas, in a grader designed to be drawn by a separate vehicle, the width of the frame and the tread are not limited by such considerations. As a result, in graders adapted to be drawn by a separate vehicle, the frame can be made wide enough to provide an adequately strong and rigid support for the mold board, and the wheels, particularly the rear wheels, can be spaced far enough apart to give sufficient stability to the grader as a whole. When the grader is made self propelled by building it around a tractor, the width of the frame is limited by the distance between the tractor wheels, and the lateral distance between the tractor wheels is limited by the axle construction to a distance considerable less than that usually employed in graders designed to be drawn by a separate vehicle. The necessity for disposing all parts of the grader frame near the longitudinal center line of the grader, makes it desirable to provide a very rigid frame and very rigid adjusting mechanism for the mold board; for the mold board, in the operation of the grader, extends laterally beyond the frame and the reaction of the road surface on it may have a lever arm which is very large relative to the width of the frame.

Another phase of the problem of producing a satisfactory self-propelled road grader is that of control. The operator not only has to maintain the mold board in proper adjustment at all times, but he must also steer the vehicle and control its speed. Because of this, it is desirable that all adjustments which the operator has to perform may be performed quickly with an expenditure of a minimum of energy.

Self-propelled road graders are used to a great extent in road maintenance work,—that is, surface smoothing. Such work demands extreme rigidity of the cutting element or scraper blade which makes necessary great stiffness in the supporting members and absence of lost-motion in the adjusting mechanisms.

It is the object of my invention, considered broadly, to produce a self-propelled road grader which may be built around a commercial form of tractor and which will operate satisfactorily to produce a smooth road surface, particularly in maintenance work. More specifically, it is my object to produce such a grader which will have a very stiff and rigid frame and which will embody adjusting devices capable of holding the blade positively in definite position relative to the grader frame and capable also of easy operation with the minimum expenditure of power on the part of the operator.

I accomplish the above objects by removing the front axle from a commercial form of tractor and by connecting this axle with the rear axle of the tractor through a main frame comprising a pair of longitudinally extending frame members between which there extend a plurality of torsion-resisting cross-members; and on this frame, at a point approximately over the mold board, I mount irreversible power-transmission mechanism adapted to adjust the mold board in height and to be controlled by an operator located near the rear of the grader.

Figure 6:
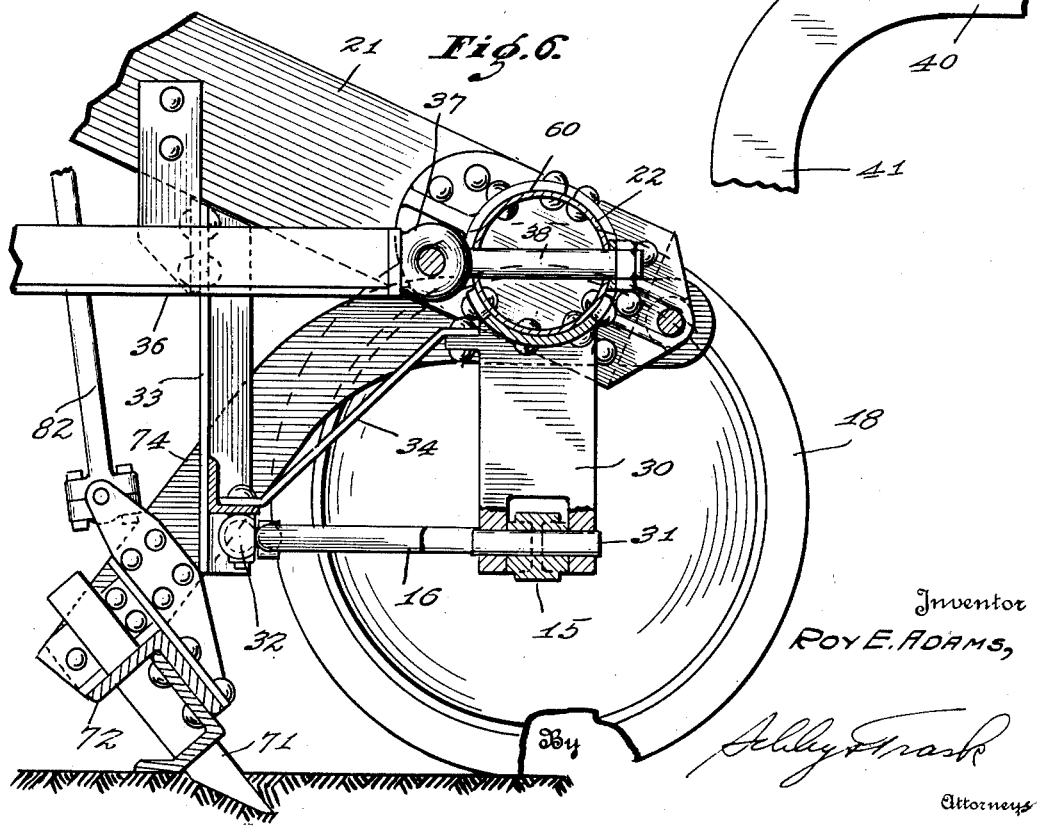

The accompanying drawings illustrate my invention: Fig. 1 is a plan view of the complete grader; Fig. 2 is a side elevation of the complete grader with the wheels on one side removed; Fig. 3 is a front elevation of the grader; Fig. 4 is a plan view of the front end of the grader generally similar to Fig. 1 but on a larger scale and having parts of the frame broken away to illustrate the construction more clearly; Fig. 5 is a fragmental side elevation, in partial section, showing the details of the irreversible power-transmission mechanism and the means for connecting it to the mold board support; and Fig. 6 is a fragmental longitudinal vertical section through the front end of the grader.

The tractor about which my grader is built comprises a sub-frame 10 adapted to support an engine (not shown) located within a hood 11 and arranged to drive a rear axle 12. The rear axle 12 is located in the usual axle housing 13 on the outer ends of which are mounted the wheels 14 driven by the axle 12. The tractor also embodies a front axle 15 which, in the commercial form of tractor, is mounted near the front end of the sub-frame 10 on a horizontal longitudinal axis and is provided with radius rods 16 adapted to be attached to the sub-frame 10 in any suitable manner. Steering is accomplished by means of steering knuckles 17 mounted on the ends of the front axle 15 and having spindles which support the front wheels 18.

In building my grader, I first remove the front axle 15 from the tractor and mount it upon the front end of a main grader frame composed primarily of two longitudinally extending frame members 21 interconnected by a front cross member 22, intermediate cross members 23 and 24, and a rear cross member 25. By this construction, and particularly by reason of the presence of the rear cross member 25, the frame is made a complete rigid unit independent of the rear axle of the tractor. Near their rear ends, the longitudinal frame members 21 are provided with brackets 27 by means of which the frame is connected for support to the rear axle housing 13. Adjacent the front end of the tractor sub-frame 10, I mount on the main frame a stirrup 28 which passes under the front end of the tractor sub-frame 10 and supports it.

As has been previously stated, the front axle of the tractor is adapted to be pivotally attached to the frame on a horizontal axis extending longitudinally of the frame, thus giving the frame a three-point support so far as the axles are concerned. The mounting of the front axle on the front end of the main grader frame is conveniently by means of a bracket 30 secured to and extending downwardly from the front crossmember 22. The bracket 30 is bifurcated at its lower end to receive the front axle 15 which is held in place by a pivot pin 31. The radius rods 16 are joined at their rear ends and provided in line with the pivot pin 31 with a ball forming part of a ball and socket mounting 32, the socket of which is supported below the main frame 21 by means of a depending yoke 33 and a diagonal brace 34. The diagonal brace 34 extends forwardly and upwardly from the lower part of the yoke 33 to the front cross-member 22 and serves to aid the yoke 33 and axle bracket 30 in sustaining longitudinal forces imposed on the front wheels.

To the front end of the grader is attached the front end of a draw bar 36. This attachment is conveniently by means of an eye 37 secured to the front end of the draw bar 36 and adapted to receive the intermediate portion of a U-bolt 38 which passes through the front cross-member 22.

A semi-circle 40 is pivotally attached on a vertical axis to the draw bar 36 and is provided with two depending legs 41 to the lower ends of which is secured a scraper blade 42.

In addition to the horizontal angular adjustment provided by the pivotal mounting of the semi-circle 40, the scraper blade 42 is also adjustable in other respects. Suitable mechanism is provided for raising or lowering the blade, for rotating it about a horizontal axis extending longitudinally of the grader, and for shifting it laterally of the grader. A means for obtaining a lateral adjustment or side shifting of the scraper blade is illustrated in Figs. 2 and 5. My invention is not concerned with any particular type of side shifting mechanism; and as the mechanism illustrated is in general well known, it is not believed necessary to describe it in detail.

The means by which vertical adjustment of the scraper blade is obtained is, however, a material part of my invention. This means includes a pair of worm wheels 44 independently mounted on axes which preferably extend transversely of the grader frame. Desirably, each worm wheel 44 is provided with an enclosing casing 45 which has bearings for a shaft 46 on which the worm wheel 44 is mounted. Each end of each shaft 46 extends outwardly beyond the bearings in the housing 45, and on the outer projecting ends of such shafts are mounted lift-arms 47. The outer ends of the lift-arms 47 are connected through lift-links 48 to cross members 49 attached to the draw bar 36 near the rear end thereof. On the inner ends of the two shafts 46, I rigidly mount arms 51 to the outer ends of which are attached counterbalancing springs 52. These springs act between the arms 51 and any convenient fixed point on the grader. As shown, the springs 52 are tension springs having their rear ends attached respectively to the arms 51, and their front ends adjustably secured to the cross member 23. The angle between each arm 51 and its associated lift-arm 47 is made such that the effective lever arm of each spring 52 will increase as such spring shortens in length upon the raising of the mold board 42.

Each of the worm wheels 44 has associated with it a worm 54 mounted upon a shaft 55 which is adapted to be driven through speed-reducing gearing 56—57 from an operating shaft 58. Each of such operating shafts may include one or more universal joints and extends to the operator's platform where it is provided with an operating crank 59.

The mounting of the lift arms 47 on transverse axes has several advantages over constructions in which lift arms are mounted on longitudinal axes. Among such advantages are greater compactness and the fact that the lift links 48 remain more nearly vertical through the range of mold board adjustment, since the upper-end of each of them always lies in the same vertical plane. Further, by mounting the worm-gears 44 and lift-arms 47 on transverse axes and the worms 54 on longitudinal axes, the operative connection between the worms and the operating shafts 58 may be effected by spur gears which are more efficient and less expensive than would be the helical or bevel gears necessary if the axes of the worms were not longitudinal.

The two worm wheels 44 and their associated worms 54 provide irreversible power-transmission mechanism by means of which the scraper blade 42 is held in any desired position in a vertical plane. Since the irreversible power-transmission mechanism provided by each worm and worm wheel is located between the longitudinally extending shaft 58 and the lift-arm 47, the shaft 58 is relieved of all shocks and stresses caused by reaction of the road on the scraper blade. This construction possesses a material advantage over graders in which the irreversible power transmission mechanism is located near the operator and transmits power to the lift-arms through shafts which are subjected to a heavy torque as a result of the reaction of the earth on the scraper blade. Since, in my improved grader, the irreversible power-transmission mechanism is located above the blade, there are no such long shafts which can twist and permit movement of the mold board relative to the frame.

The presence of both the speed-reducing gearing 56—57 and the worm gearing 44—54 in the blade adjusting mechanism has a decided advantage, for the use of the spur gears 56 and 57 enables me to provide adequate mechanical advantage in the blade adjusting mechanism without the necessity either for unduly increasing the diameter of the worm-wheel 44 or for reducing the pitch of the worm teeth to such a point that they would not have sufficient thickness to sustain the forces imposed upon them. Further, by putting the speed-reducing gearing 56—57 between the operating shaft and the worm 54, the peripheral speed of the worm is lessened and the power loss due to friction between the teeth of the worm and gear is considerably reduced.

The cross-members 22, 23, 24, and 25 of the grader frame are desirably heavy, tubular cross-members. At each end of each of these cross-members, I provide a pair of half-collars 60 riveted to the associated cross-member and having flanges 61 riveted to the inner faces of the longitudinally extending frame members 21, which conveniently are of channel-section arranged with their flanges extending outwardly, as is clear from the drawings. These heavy torsion-resisting cross-members 22, 23, 24, and 25 prevent any material twisting of the frame, for the frame cannot twist without twisting the cross-members.

The presence of the rear cross-member 25 is of particular importance, for several reasons. In the first place, the ability to sustain twisting stresses without distortion is much more important in the rear part of the grader frame than in the front part, for the front end of the grader frame is pivotallly mounted on the pin 31. In the second place, the presence of the tractor unit between the longitudinal frame members 21 near the rear thereof prevents the presence of any cross bracing there. In the third place, the rear axle housing 13 of the ordinary commercial tractor must be protected from any torsional stresses which it is not designed to sustain. By extending the longitudinal frame members 21 rearwardly beyond the rear axle housing 13 and there placing between them the cross-member 25, I am enabled, without imposing any torsional stresses on the rear axle housing 13, to change the character of the rear ends of the longitudinal frame members 21 from cantilevers to beams which not only are supported at both ends but which are constrained at both ends, thus adding greatly to the rigidity of the frame and utilizing to the utmost such lateral stability as the grader possesses.

For the purpose of steering the grader, I may provide a worm and sector enclosed within a casing 63 and having a swingable arm 64 connected by a link 65 to one of the steering knuckles 17, such knuckles being interconnected by a drag link 66. The worm and sector enclosed within the casing 63 is operated by means of a shaft 68 which may have one or more universal joints and which extends rearwardly to the operator's platform where it is provided with an operating wheel 69.

If desired, I may include in my graded a scarifier composed of a plurality of teeth 71 mounted in a tooth-support 72. Each tooth may be held in the desired position in the support 72 by means of a set-screw 73. The support 72 is rigidly connected to two scarifier draw-bars 74 which extend forwardly and upwardly and are pivotally attached to the front end of the grader frame, as by means of a laterally extending pivot bolt 75.

The scarifier may be adjusted by mechanism similar to the irreversible power-transmission mechanism employed to adjust the scraper blade 42. This mechanism may embody a worm gear enclosed within a casing 76 and spur gears enclosed within a casing 77. An operating shaft 78, which may have one or more universal joints, extends rearwardly to the operator's platform and is there provided with an operating crank 79.

Rotation of the shaft 78 is transmitted through the speed-reducing gearing in the housing 76 and 77 to a transverse shaft 80 on the ends of which are rigidly mounted scarifier lift-arms 81 connected through scarifier lift-links 82 to the tooth support 72.

Desirably, the yoke 33 which supports the rear ends of the radius rods 16 embodies two vertical braces 33' which are so laterally spaced that they will lie closely adjacent to the inner faces of the scarifier draw bars 74. This construction has the advantage that the braces 33' serve as guides for the scarifier draw bars and oppose lateral displacement of the scarifier. As a result, any tendency of the scarifier to be displaced laterally is taken by the braces 33' and is through them transmitted to the rigid torsion-resisting main frame which by reason of its stiffness is enabled to hold the scarifier against lateral displacement.

The engine and operating mechanism of the tractor have not been described, as they form no part of my invention and may be of any desired type. Such mechanism is controlled by the operator who stands on an operating platform 85 located near the rear of the grader. The various operating cranks 59, 69, and 79 are all located adjacent the platform 85 where they are readily accessible to the operator. The great mechanical advantage provided by the spur gearing 56—57 and by the worm gearing 44—45 enables the operator to effect adjustment of the mold board rapidly and easily. For the same reason, adjustment of the scarifier is also readily and easily effected.

By the construction described, the main frame, which is limited in width by the necessity for its passing between the rear wheels 14, is made exceedingly rigid and well able to sustain the twisting strains imparted to it by the ground reaction on the scraper blade 42, even though the blade be set in such a position that its ends project laterally a considerable distance beyond the main frame, thus giving the reaction of the earth on the blade a long effective lever arm. By locating the irreversible power-transmission mechanism above the scraper blade, forces imposed on the blade are directly transmitted to irreversible gearing and the rigid main frame and are not permitted to displace the scraper blade as would be the case if such forces were resisted by long shafts capable of considerable twisting.

Because of the rigid main frame which is provided in accordance with my invention and because of the direct connection between the scraper blade and this frame, my grader is admirably adapted for the use in maintaining and finishing roads; for the blade is held in definite positions of vertical adjustment from which it cannot be displaced by any force likely to be imposed upon it.

I claim as my invention:

1. A motor road grader, comprising a main frame, a sub-frame for supporting an engine and having an axle housing located near the rear end of said sub-frame, a scraper blade adjustably mounted on said main frame, and means for supporting the front end of said main frame, said main frame including two laterally spaced longitudinally extending frame members attached to said axle housing, and one or more torsion-resisting cross-members extending between the longitudinal frame members and rigidly attached thereto, there being one of said cross-members in rear of said axle housing.

2. A motor road grader, comprising a main frame, a sub-frame for supporting an engine and having an axle housing located near the rear end of said sub-frame, a scraper blade adjustably mounted on said main frame, and means for supporting the front end of said main frame, said main frame including two laterally spaced longitudinally extending frame members attached to said axle housing and two torsion-resisting cross-members extending between the longitudinal frame members and rigidly attached thereto, said cross-members being located on opposite sides of said sub-frame.

3. A motor road grader, comprising a main frame, a sub-frame for supporting an engine and having an axle housing located near the rear end of said sub-frame, a scraper blade adjustably mounted on said main frame, and means for supporting the front end of said main frame, said main frame including two laterally spaced longitudinally extending frame members attached to said axle housing, and one or more tubular cross-members extending between the longitudinal frame members and rigidly attached thereto, there being one of said cross-members in rear of said axle housing.

4. A motor road grader, comprising a main frame, a sub-frame for supporting an engine and having an axle housing located near the rear end of said sub-frame, means for supporting the front end of said main frame, said main frame including two laterally spaced longitudinally extending frame members attached to said axle housing, and one or more torsion-resisting cross-members extending between the longitudinal frame members and rigidly attached thereto, there being one of said cross-members in rear of said axle housing, a scraper blade, and means for adjusting said scraper blade, said blade-adjusting means including irreversible power-transmission mechanism mounted on said frame above said blade.

5. A road grader, comprising a frame having longitudinal side members and transversely extending tubular cross members, front and rear axles for supporting said frame, radius rods attached to said front axle and extending rearwardly therefrom, braces extending downward from said frame to support the rear ends of said radius rods, a ground-cutting element vertically adjustable relative to said frame, a drawbar including two transversely spaced members attached at their rear ends to said ground-cutting element and pivotally attached at their front ends to said frame, said members being disposed close to said braces whereby the latter in co-operation with said frame may serve to prevent lateral displacement of said ground-cutting element.

6. A road grader, comprising a frame having longitudinal side members and transversely extending tubular cross members, front and rear axles for supporting said frame, braces extending downward from said frame, a ground-cutting element vertically adjustable relative to said frame, a draw bar including two transversely spaced members attached at their rear ends to said ground-cutting element and pivotally attached at their front ends to said frame, said members being disposed close to said braces whereby the latter in co-operation with said frame may serve to prevent lateral displacement of said ground-cutting element.

7. A motor road grader, comprising a main frame, a sub-frame for supporting an engine and having an axle housing located near the rear end of said sub-frame, a scraper blade adjustably mounted on said main frame, and means for supporting the front end of said main frame, said main frame including two laterally spaced longitudinally extending frame members attached to said axle housing and projecting rearwardly beyond said axle housing, a torsion-resisting member located in rear of said axle housing and extending between said longitudinal frame members and rigidly attached thereto, and a stirrup depending from said main frame for supporting the front end of said sub-frame.

8. A motor road grader, comprising a main frame, a sub-frame for supporting an engine and having an axle housing located near the rear end of said sub-frame, a scraper blade adjustably mounted on said main frame, and means for supporting the front end of said main frame, said main frame including two laterally spaced longitudinally extending frame members attached to said axle housing and projecting rearwardly beyond said axle housing, a heavy tubular member located in rear of said axle housing and extending between said longitudinal frame members and rigidly attached thereto, and a stirrup depending from said main frame for supporting the front end of said sub-frame.

9. A motor road grader, comprising a main frame, a sub-frame for supporting an engine and having an axle housing located near the rear end of said sub-frame, a scraper blade adjustably mounted on said main frame, and means for supporting the front end of said main frame, said main frame including two laterally spaced longitudinally extending frame members attached to said axle housing and projecting rearwardly beyond said axle housing, a torsion-resisting member located in rear of said axle housing and extending between said longitudinal frame members and rigidly attached thereto, a stirrup depending from said main frame for supporting the front end of said sub-frame and a second torsion-resisting member located ahead of said stirrup and extending between said longitudinal frame members and rigidly attached thereto.

10. A motor road grader, comprising a main frame, a sub-frame for supporting an engine and having an axle housing located near the rear end of said sub-frame, a scraper blade adjustably mounted on said main frame, and means for supporting the front end of said main frame, said main frame including two laterally spaced longitudinally extending frame members attached to said axle housing and projecting rearwardly beyond said axle housing, a heavy tubular member located in rear of said axle housing and extending between said longitudinal frame members and rigidly attached thereto, a stirrup depending from said main frame for supporting the front end of said sub-frame, and a second heavy tubular member located ahead of said stirrup and extending between said longitudinal frame members and rigidly attached thereto.

11. A road grader, comprising a frame, front and rear axles for supporting said frame, radius rods attached to said front axle and extending rearwardly therefrom, braces extending downward from said frame to support the rear ends of said radius rods, a ground-cutting element vertically adjustable relative to said frame, a draw-bar including two transversely spaced members attached at their rear ends to said ground-cutting element and pivotally attached at their front ends to said frame, said members being disposed close to said braces whereby the latter in co-operation with said frame may serve to prevent lateral displacement of said ground-cutting element.

12. A road grader, comprising a frame, front and rear axles for supporting said frame, braces extending downward from said frame, a ground-cutting element vertically adjustable relative to said frame, a draw bar including two transversely spaced members attached at their rear ends to said ground-cutting element and pivotally attached at their front ends to said frame, said members being disposed close to said braces whereby the latter in co-operation with said frame may serve to prevent lateral displacement of said ground-cutting element.

13. In a road-working machine, a main frame comprising longitudinal side members, front steerable wheels supporting the front end of said main frame, a power unit located at the rear end of said main frame and including drive wheels mounted near the rear end of said main frame, a transverse yoke secured to said side members and to the front end of said power unit to support the latter from said side members, a swinging sub-frame mounted beneath said main frame, a scraper blade mounted on said sub-frame, and means for vertically adjusting said scraper blade, said means including generally vertically adjustable members supported from said main frame in advance of said power unit and connected to said sub-frame at laterally spaced points, irreversible power-transmission mechanisms rigidly mounted on said main frame substantially above said blade and in advance of said power unit for adjusting said adjustable members, said main frame being provided with two torsion-resisting cross-members located respectively ahead of and in rear of said irreversible power-transmission mechanisms and extending between and rigidly secured to said side members whereby said main frame is rendered rigid and the weight of said power unit made available to resist vertical displacement of said blade under the influence of road reactions.

14. In a road-working machine, a main frame comprising longitudinal side members, front steerable wheels supporting the front end of said main frame, a power unit located at the rear end of said main frame and including drive wheels mounted near the rear end of said main frame, a transverse yoke secured to said side members and to the front end of said power unit to support the latter from said side members, a swinging sub-frame mounted beneath said main frame, a scraper blade mounted on said sub-frame, and means for vertically adjusting said scraper blade, said means including generally vertically adjustable members supported from said main frame in advance of said power unit and connected to said sub-frame at laterally spaced points, irreversible power-transmission mechanisms rigidly mounted on said main frame substantially above said blade and in advance of said power unit for adjusting said adjustable members, said main frame being provided with a torsion-resisting cross-member located between said yoke and said irreversible power-transmission mechanisms and extending between and rigidly secured to said side members whereby said main frame is rendered rigid and the weight of said power unit made available to resist vertical displacement of said blade under the influence of road reactions.

15. In a road-working machine, a main frame comprising longitudinal side members, front steerable wheels supporting the front end of said main frame, a power unit located at the rear end of said main frame and including drive wheels mounted near the rear end of said main frame, a swinging sub-frame mounted beneath said main frame, a scraper blade mounted on said sub-frame, and means for vertically adjusting said scraper blade, said means including generally vertically adjustable members supported from said main frame in advance of said power unit and connected to said sub-frame at laterally spaced points, irreversible power-transmission mechanisms rigidly mounted on said main frame substantially above said blade and in advance of said power unit for adjusting said adjustable members, said main frame being provided with two torsion-resisting cross-members located respectively ahead of and in rear of said irreversible power-transmission mechanisms and extending between and rigidly secured to said side members whereby said main frame is rendered rigid and the weight of said power unit made available to resist vertical displacement of said blade under the influence of road reactions.

ROY E. ADAMS.